(12) United States Patent
Soika et al.

(10) Patent No.: US 8,214,005 B2
(45) Date of Patent: Jul. 3, 2012

(54) METHOD FOR OPERATION OF AN ARRANGEMENT HAVING AT LEAST ONE SUPERCONDUCTING CABLE

(75) Inventors: Rainer Soika, Hannover (DE); Mark Stemmle, Hannover (DE)

(73) Assignee: Nexans, Paris (FR)

( * ) Notice: Subject to any disclaimer, the term of this patent is extended or adjusted under 35 U.S.C. 154(b) by 31 days.

(21) Appl. No.: 12/952,631

(22) Filed: Nov. 23, 2010

(65) Prior Publication Data

US 2011/0152103 A1    Jun. 23, 2011

(30) Foreign Application Priority Data

Nov. 26, 2009  (EP) .................................... 09306139

(51) Int. Cl.
*H01L 39/24* (2006.01)
*H01B 12/00* (2006.01)
(52) U.S. Cl. ........................ 505/232; 174/125.1; 62/50.7
(58) Field of Classification Search .................. 505/230, 505/232, 866, 890, 897; 174/125.1; 62/50.1, 62/6, 50.7, 125, 126, 127
See application file for complete search history.

(56) References Cited

U.S. PATENT DOCUMENTS

| | | | |
|---|---|---|---|
| 3,946,141 A * | 3/1976 | Schmidt ...................... | 174/11 R |
| 3,950,606 A | 4/1976 | Schmidt | |
| 3,960,606 A * | 6/1976 | Chia et al. ..................... | 148/550 |
| 6,354,087 B1 * | 3/2002 | Nakahara et al. .................. | 62/6 |
| 7,263,845 B2 * | 9/2007 | Lee .................................. | 62/115 |
| 7,358,435 B2 * | 4/2008 | Ladie' et al. .................. | 174/15.4 |
| 7,614,243 B2 * | 11/2009 | Masuda et al. .................. | 62/113 |
| 2005/0056456 A1 | 3/2005 | Ladie et al. | |

FOREIGN PATENT DOCUMENTS

WO       WO 03052775 A1  *  6/2003

* cited by examiner

*Primary Examiner* — Colleen Dunn

(74) *Attorney, Agent, or Firm* — Sofer & Haroun, LLP

(57) ABSTRACT

A method is specified for operation of an arrangement having at least one superconducting cable, which is surrounded by a cryostat which consists of two metallic tubes, which are arranged concentrically with respect to one another and enclose vacuum insulation between them. The cryostat surrounds not only the cable but also a cavity for a pressurized coolant to pass through. A reservoir area, which is connected to the cryostat, for the coolant is arranged at least at one end of the cryostat and a pump is used which forces the coolant into the cryostat during operation of the arrangement. A valve is arranged at least in the supply path of the coolant from the reservoir area to the cryostat, which valve is open during operation of the arrangement, is connected to at least one unit monitoring the soundness of the cryostat and is blocked when a signal which corresponds to a fault message is present from the monitoring unit, in order to interrupt the supply of the coolant to the cryostat.

5 Claims, 1 Drawing Sheet

METHOD FOR OPERATION OF AN ARRANGEMENT HAVING AT LEAST ONE SUPERCONDUCTING CABLE

RELATED APPLICATION

This application claims the benefit of priority from European Patent Application No. 09 306 139.8, filed on Nov. 26, 2009, the entirety of which is incorporated by reference.

BACKGROUND

1. Field of the Invention

The invention relates to a method for operation of an arrangement having at least one superconducting cable, which is surrounded by a cryostat which consists of two metallic tubes, which are arranged concentrically with respect to one another and enclose vacuum insulation between them, and which cryostat surrounds not only the cable but also a cavity for a pressurized coolant to pass through.

2. Description of the Related Art

A method such as this is disclosed in WO 03/052775 A.

In modern technology, a superconducting cable has electrical conductors composed of a composite material which contains ceramic material that changes to the superconducting state at sufficiently low temperatures. The electrical direct-current resistance of a correspondingly constructed conductor is zero, if the cooling is adequate, provided that a specific current level is not exceeded. By way of example, suitable ceramic materials are materials doped with rare earths, which have become known by the name ReBCO (rare-earth barium-copper oxide), in particular including YBCO (yttrium-barium-copper oxide). Another of these superconducting materials is, for example, BSCCO (bismuth-strontium-calcium-copper oxide). Sufficiently low temperatures to change a material such as this to the superconducting state are, for example, between 67 K and 110 K. Suitable coolants are, for example, nitrogen, helium, neon and hydrogen, or mixtures of these substances.

When carrying out the method described initially and during operation of the associated arrangement, the liquid coolant is forced into the cryostat at a predetermined pressure by means of the pump, is passed through the cryostat while maintaining the pressure, and is passed out to be cooled down again at the end of the predetermined length. For adequate cooling of the at least one superconducting conductor in the cable located in the cryostat, a considerable amount of coolant must be lowered to the required low temperature, and must be kept at this temperature in the reservoir area, and if possible in the cryostat as well. If, in the course of a transmission path, the cryostat is damaged, in particular with a leak occurring in it, for example as a result of external mechanical damage to the cryostat, a large amount of coolant can emerge from the cryostat before, for example, a leak is found. This is not only expensive but is also hazardous to the area around the arrangement, particularly if liquid nitrogen is used as the coolant. This is also true when a leak actually occurs in the supply line of the coolant to the cryostat.

U.S. Pat. No. 3,946,141 A describes a method for cooling an electrical cable which is equipped with superconducting cables, in which the conductors are arranged in the form of a coaxial cable. The cable consists of two parts which merge into one another in the central area of the cable and are equipped with end closures at each of their ends. In its central area, connecting the two parts, a coolant, such as helium, is passed from a cooling station to the cable by means of a pump and is fed from there into the two parts of the cable in the opposite flow direction. The coolant is passed out at each of the end closures of the cable, and is fed back into the cooling station.

U.S. Pat. No. 3,950,606 discloses a method for cooling a superconducting cable whose conductors are likewise arranged in the form of a coaxial cable, having a tubular inner conductor and an outer conductor which concentrically surrounds it, with a dielectric inbetween them. A tube consisting of two tube elements separated by a cavity surrounds the outer conductor and a coolant, for example helium, is passed through it, and is fed back to the refrigeration unit by means of a separate line. The coolant is also passed through the tubular inner conductor in the same sense.

WO 03/052775 A1, cited initially, describes a superconducting cable with a cold dielectric. This is accommodated in a cryostat which consists of two tubes which are separated by vacuum insulation and run concentrically with respect to one another. This document deals essentially with the connection through the cryostat when at least two lengths of an arrangement such as this are intended to be connected to one another. The document likewise provides no details of measures to be taken in the event of damage to the cryostat, when a coolant is fed into the free space in the cryostat.

OBJECTS AND SUMMARY

The invention is based on the object of carrying out the method described initially in such a way as to improve the safety of an arrangement having a superconducting cable and a cryostat surrounding it, as well as its surrounding area, when the arrangement is damaged.

This object is achieved by a reservoir area, which is connected to the cryostat, for the liquid coolant is arranged at least at one end of the cryostat. A pump is used which forces the coolant into the cryostat during operation of the arrangement. A valve is arranged at least in the supply path of the coolant from the reservoir area to the cryostat, which valve is open during operation of the arrangement, is connected to at least one unit monitoring the soundness of the cryostat and is blocked when a signal which corresponds to a fault message is present from the monitoring unit, in order to interrupt the supply of the coolant to the cryostat.

When using this method, the soundness of the arrangement and in particular of the cryostat is checked continuously by the monitoring unit. If the cryostat is damaged, for example it leaks, a signal is passed directly to the valve, and advantageously at the same time to the pump. The valve is then closed immediately, and the pump is switched off at the same time, so that no further coolant is pumped into the cryostat or out of the reservoir area. The monitoring unit can advantageously be a pressure measurement instrument, which measures the pressure of the coolant in the cryostat.

If, in one preferred embodiment, only the pressure of the cooling medium in the cryostat is monitored, then one pressure measurement instrument is sufficient for each section of the transmission path. In addition, the unit which is used for monitoring may, however, also have sensors, for example, which are arranged along the transmission path and additionally monitor the soundness of the cryostat without any need for a leak extending into its interior to occur. By way of example, sensors such as these allow damage to the outer tube of the cryostat to be detected, which leads to a collapse of the vacuum insulation between the tubes of the cryostat, and therefore to failure of the function of maintaining the cooling of the superconducting conductor. In this case as well, the valve is closed and the pump switched off by an appropriate signal.

BRIEF DESCRIPTION OF THE DRAWINGS

The method and the arrangement according to the invention will be explained with reference to the drawings, as an exemplary embodiment, and in which.

DETAILED DESCRIPTION

In the illustrated exemplary embodiment, only one valve is shown in the area of an end closure of the arrangement, and this will be explained in the following description. However, it is also possible for two or more valves to be arranged in the profile of the transmission path. Both the valve and the pump which moves the coolant are known for the stated low temperatures, and are commercially available.

Figure 1:
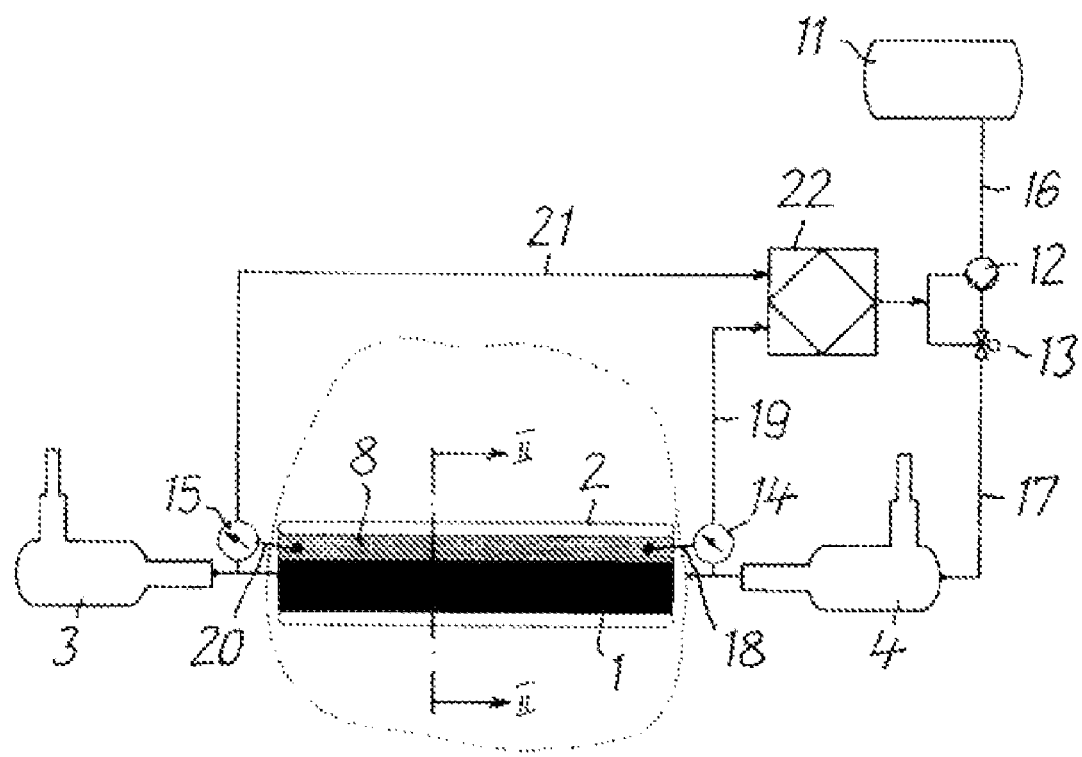
FIG. 1 shows a schematic illustration of an arrangement for carrying out the method according to the invention.

FIG. 1 schematically illustrates a transmission path for electric current by means of a superconducting cable 1 which is arranged in a cryostat 2. In the illustrated exemplary embodiment, the transmission path runs between two end closures 3 and 4. For the purposes of the invention, however, a transmission path may in principle also run between an end closure and a connecting collar, or two other closures for this purpose. In the following text, the transmission path running between the two end closures 3 and 4 will be considered, as also being representative for all the other embodiments.

Figure 2:
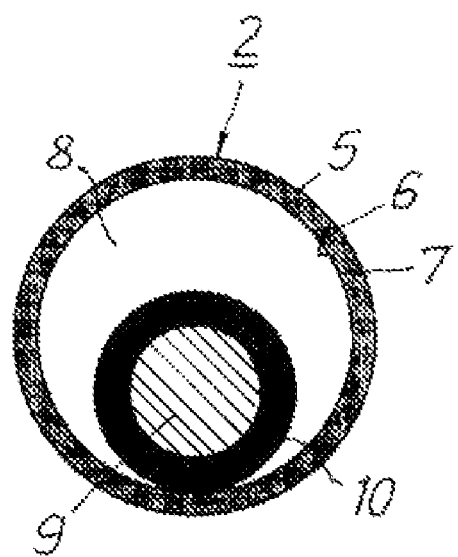
FIG. 2 shows a section through FIG. 1, along the line II-II.

The cryostat 2 for the transmission path as shown in FIG. 2 consists of two metallic tubes 5 and 6 which are fitted concentrically with respect to one another, with a distance between them, and between which vacuum insulation 7 is located. The tubes 5 and 6 may be corrugated transversely with respect to their longitudinal direction.

The aim is to arrange at least one superconducting cable 1 in the cryostat 2, leaving a cavity 8 free for a coolant to pass through, advantageously liquid nitrogen. The construction of the superconducting cable 1 is known per se. It will therefore not be described in any more detail here. The superconducting cable 1 has at least one superconducting conductor 9 and a dielectric 10 surrounding it.

The superconducting cable 1 and the cryostat 2 are connected on the one hand electrically conductively and on the other hand in a gas-tight manner to the end closures 3 and 4. The electrical through-connection of the cable 1 and the gas-tight connection of the cryostat 2 are in principle known, and will therefore not be described in any more detail.

In the area of the end closure 4, the arrangement has a reservoir area 11 which contains the coolant for cooling the cable 1, a pump 12, a valve 13 and a pressure measurement instrument 14. A pressure measurement instrument 15 is arranged in the area of the end closure 3.

The pump 12 is connected on the one hand via a pipeline 16 to the reservoir area 11 and on the other hand via a pipeline 17 to the end closure 4 and, beyond this, to the free space 8 in the cryostat 2. The valve 13 is fitted in the pipeline 17. The pressure measurement instrument 14 is connected, via a pipeline 18, which is only indicated schematically here and to whose end a pressure-sensitive sensor is fitted, to the free space 8 in the cryostat 2 and, via an electrical line 19, to the valve 13. In addition, it can also be electrically conductively connected to the pump 12. The pressure measurement instrument 15, which is arranged in the area of the end closure 3, is connected via a pipeline 20, which is once again only indicated schematically and at whose end a pressure-sensitive sensor is fitted, to the free space 8 in the cryostat 2 and, via an electrical line 21, to the valve 13. The pressure measurement instrument 15 can also be electrically conductively connected to the pump 12.

The electrical lines 19 and 21 are advantageously also used to connect the pressure measurement instruments 14 and 15 to the pump 12. In the exemplary embodiment illustrated in FIG. 1, they are connected to an electrical control unit 22, which is itself connected both to the valve 13 and to the pump 12 via electrical lines.

In principle, it is sufficient for the method and the arrangement according to the invention for the pressure of the coolant to be measured in the area of the end closure 3 because this is where the pressure is lowest, even when the arrangement is operating correctly. This means that the arrangement in principle requires only the pressure measurement instrument 15. However, since the cryostat 2 may also be damaged in the immediate vicinity of the end closure 4, the pressure measurement instrument 14 is advantageously also used.

The method according to the invention with an arrangement as shown in FIGS. 1 and 2 is carried out, for example, as described in the following text. In this case, it is first of all assumed that there is a pressure measurement instrument, specifically the pressure measurement instrument 15, only in the end closure 3.

Liquid nitrogen at a temperature of about 67 K is pumped as the coolant by means of the pump 12 into the cryostat 2, in the area of the end closure 4, to be precise, for example, at a pressure of about 20 bar. In this case, the valve 13 is open, that is to say nitrogen can pass through it. As soon as the cable 1 and its conductors 9 have been cooled to the temperature of, for example, about 67 K required to achieve superconductivity, the conductors 9 are connected to a voltage source, in order to transmit current. The nitrogen is moved at a speed of, for example, 0.1 m/s to 1.0 m/s through the cryostat 2 and is passed out at the end of the transmission path, in the end closure 3, in order to be cooled down again. The nitrogen pressure decreases as the distance from the feed point in the end closure 4 increases. By way of example, it should not fall below 15 bar. The pressure measurement instrument 15 is set appropriately.

If a leak occurs in the course of the transmission path in the cryostat 2, as a result of mechanical damage to the cryostat 2, nitrogen emerges through the leak out of the cryostat 2. In consequence, the pressure of the nitrogen in the cryostat 2 falls rapidly and suddenly. This is identified by the pressure measurement instrument 15. As soon as the pressure is less than 15 bar, the valve 13 is closed by a signal which is sent from the pressure measurement instrument 15. At the same time, the pump 12 can likewise be switched off by an electrical signal from the pressure measurement instrument 15. This terminates the supply of nitrogen to the cryostat 2. At the same time, the cable 1 can be disconnected from the voltage source.

In addition, the soundness of the cryostat 2 can also be monitored to determine whether, for example, there is only damage to the outer tube 5 of the cryostat without a complete leak occurring in the cryostat 2. For this purpose, a sensor unit which reacts to cold can be fitted as a monitoring unit on the outside of the cryostat 2, over the entire length of the transmission path. The sensor unit may consist of a multiplicity of temperature sensors or else of at least one optical waveguide, which react or reacts to cold which emerges from the vacuum insulation 6 or from the outer tube 5 of the cryostat when damage occurs. The temperature sensors or the optical waveguide in which the cold produces a considerable increase in the vaporization can likewise be connected via electrical lines to the valve 13 and, if appropriate, to the pump 12. Their signals then likewise lead to closure of the valve 13 and to the pump 12 being switched off, without the pressure of the coolant in the cryostat 2 having fallen below its lower limit.

The invention claimed is:

1. Method for operation of an arrangement having at least one superconducting cable, which is surrounded by a cryostat which consists of two metallic tubes, which are arranged concentrically with respect to one another and enclose vacuum insulation between them, and which cryostat (2) surrounds not only the cable but also a cavity (8) for a pressurized coolant to pass through, said method comprising the steps of:

arranging at least at one end of the cryostat, a reservoir area, which is connected to the cryostat, for the liquid coolant;

using a pump which forces the coolant into the cryostat during operation of the arrangement; and arranging, at least in the supply path of the coolant from the reservoir area to the cryostat, a valve which is open during operation of the arrangement, is connected to at least one unit monitoring the soundness of the cryostat and is blocked when a signal which corresponds to a fault message is present from the monitoring unit, in order to interrupt the supply of the coolant to the cryostat.

2. Method according to claim 1, wherein at least one pressure measurement instrument is used as the monitoring unit, and monitors the pressure of the coolant in the cryostat.

3. Method according to claim 1, wherein a sensor unit, which reacts to cold, is arranged as the monitoring unit outside the cryostat over its entire length.

4. Method according to claim 3, wherein a multiplicity of temperature sensors are arranged along the cryostat.

5. Method according to claim 3, wherein at least one optical waveguide is arranged along the cryostat.

* * * * *